United States Patent [19]

Tsuchida et al.

[11] Patent Number: 4,810,071

[45] Date of Patent: Mar. 7, 1989

[54] VARIABLE FOCAL LENGTH LENS SYSTEM

[75] Inventors: Hirofumi Tsuchida; Shin-ichi Mihara, both of Tokyo, Japan

[73] Assignee: Olympus Optical Co., Ltd., Tokyo, Japan

[21] Appl. No.: 19,974

[22] Filed: Feb. 27, 1987

[30] Foreign Application Priority Data

Feb. 27, 1986 [JP] Japan .................................. 61-40320

[51] Int. Cl.$^4$ ...................... G02B 15/14; G02B 13/18; G02B 9/60; G02B 15/02

[52] U.S. Cl. .................................... 350/423; 350/432; 350/465; 350/422

[58] Field of Search ............... 350/423, 432, 437, 465, 350/414, 447, 422

[56] References Cited

U.S. PATENT DOCUMENTS 2,554,679 5/1951 Mitchell ............................. 352/140
3,160,699 12/1964 Yamaji ................................ 350/427
3,972,592 8/1976 Ruben ................................. 350/423

FOREIGN PATENT DOCUMENTS 373755 4/1923 Fed. Rep. of Germany ...... 350/447
60-91320 5/1985 Japan .
60-107013 6/1985 Japan .

Primary Examiner—John K. Corbin
Assistant Examiner—Ronald M. Kachmarik
Attorney, Agent, or Firm—Cushman, Darby & Cushman

[57] ABSTRACT

A variable focal length lens system comprising a first lens unit which comprises a negative meniscus lens and a positive lens, a second lens unit which comprises a negative lens, and a third lens unit which comprises at least three lenses including at least one negative lens, the variable focal length lens system being arranged to vary the focal length by moving the second lens unit and arranged to have a large aperture ratio and high vari-focal ratio and to be small in size.

11 Claims, 8 Drawing Sheets

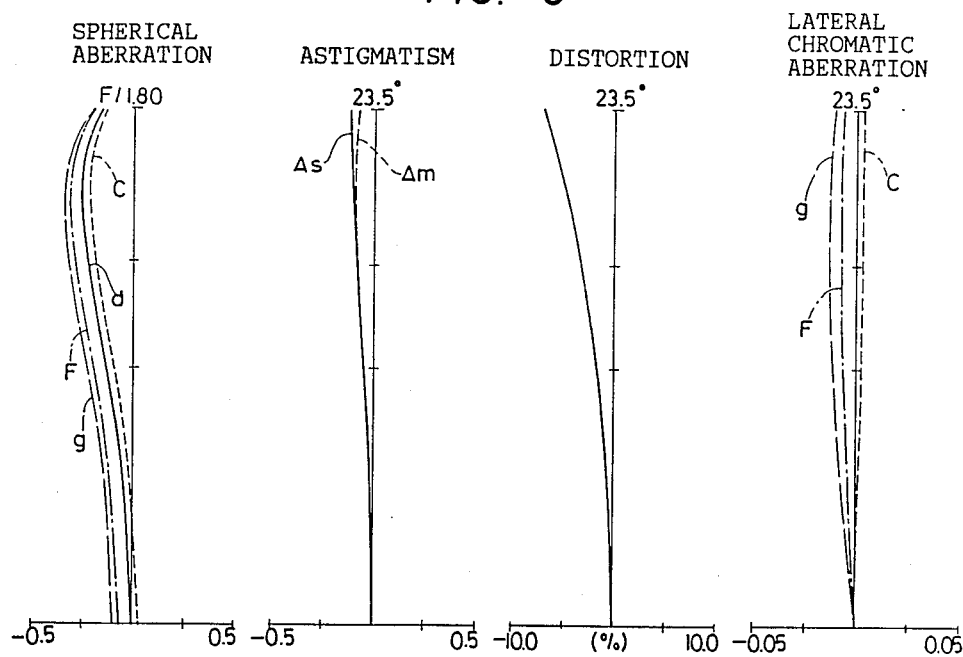
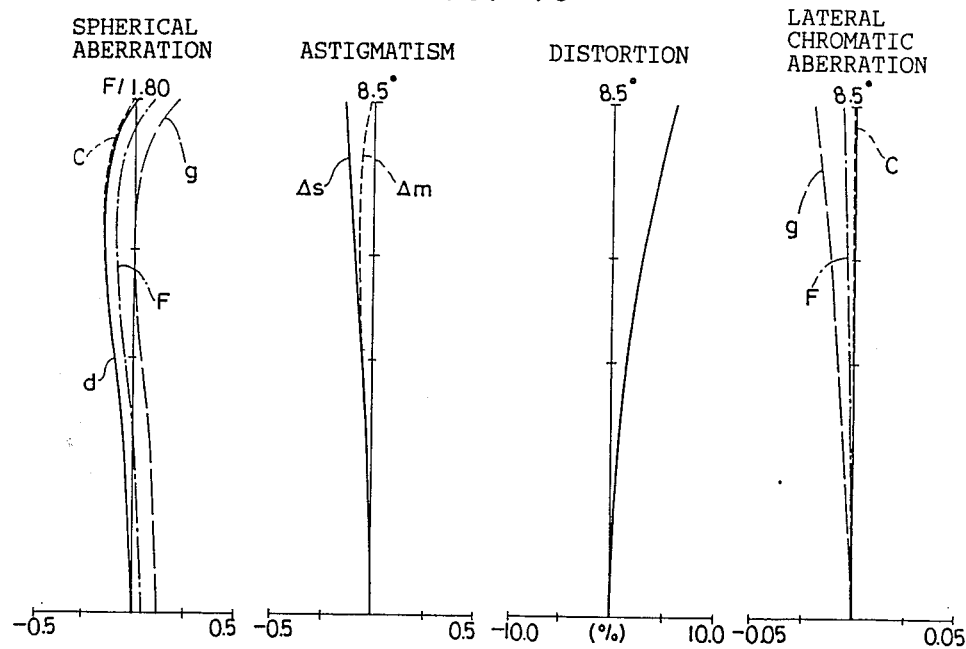

VARIABLE FOCAL LENGTH LENS SYSTEM

BACKGROUND OF THE INVENTION (a) Field of the Invention

The present invention relates to a variable focal length lens system and, more particularly, to a variable focal length lens system arranged to be capable of photographing with at least two different focal lengths by changing over the focal length by moving a lens unit thereof.

(b) Description of the Prior Art

Video cameras did not become so popular because they were high-priced and heave compared with conventional cameras for silver salt films. Recently, however, video cameras have been made smaller in size, lighter in weight and lower in price, and there is a quickly increasing demand at present for video cameras for general consumers (not for business use). To further widen the scope of users, it is now earnestly required to provide video cameras which are still smaller in size, ligher in weight and lower in price. On account of the above-mentioned requirement, it is of course required to make the lens systems for video cameras also smaller in size, lighter in weight and lower in price. Under existing circumstances, however, lens systems for video cameras are not yet made satisfactorily compact compared with electric systems of video camera bodies.

As for lens systems, it is considerably difficult under existing circumstances to make them still smaller in size, lighter in weight and lower in price by ensuring satisfactory specifications such as the zoom ratio, F-number, etc. unless an epoch-making invention is made in the field of optical elements. Therefore, as a way for solving the above-mentioned problem, there is an idea to provide a lens system with fixed focal length to a video camera and to make the video camera as a whole extremely small in size, and video cameras with such specifications are actually provided already. However, the lens systems with fixed focal length have a disadvantage that the available scope of variety in photographing is narrow.

Such being the cirumstances, attention is called to a focal length change-over type variable focal length lens system which exists between zoom lens systems and lens systems with fixed focal length.

As lens systems to be used with still cameras for silver salt films, there exist a plural number of known focal length change-over type variable focal length lens systems. For example, one of said known lens systems is arranged that a lens unit having negative refractive power is to be inserted on the image side of a lens system with a short focal length so as to thereby change over to the state of a long focal length. Another example of said known lens systems is arranged as a zoom lens system comprising two lens units, i.e., a front lent unit and a rear lens unit.

In case of the former example of the known lens system, the F-number is multiplied by the vari-focal ratio when changed over to the state of the long focal length and, consequently, the lens system becomes dark. Moreover, the vari-focal ratio itself cannot be made higher than about 2 from the view point of imaging performance, and this is not sufficient for satisfying the requirement.

In case of the latter example arranged as a zoom lens system comprising two lens units, when it is arranged to vary the focal length by keeping one of the front and rear lens units fixed and moving the other lens unit only, focal lengths at which the image surface comes to the same position scarcely exist within the vari-focal range and, when it is attempted to arrange that the image surface comes to the same position when the focal length is varied, the performance tends to become unfavourable. Therefore, it is unavoidable to move both of the two lens units in most cases, and it is often necessary to move the stop. Moreover, in the position of the long focal length, it is difficult to make the F-number small, i.e., to make the lens system bright, by keeping the performance in the favourable state and, even when an aspherical surface is adopted, it is difficult to obtain a satisfactory F-number. Furthermore, the vari-focal ratio becomes about 2, and this is not satisfactory.

In cases of the above-mentioned examples of known lens systems, the number of lenses constituting the lens system is six to eight in both cases.

As described so far, as a lens system for a video camera, there exists no known variable focal length lens system of the focal length change-over type which is arranged to be compact, low in price and excellent in performance.

SUMMARY OF THE INVENTION

It is, therefore, a primary object of the present invention to provide a variable focal length lens system to be used with a video camera for which the focal length change-over type lens system is adopted and which is arranged that the ratio between the longest focal length and shortest focal length is about 2.5 to 3, the numerical aperture is about F/1.8, the ratio of the overall length of the lens system to the focal length in the wide position is about 5, the number of lenses constituting the lens system is six or seven, the number of movable lens unit to be moved for varying the focal lenght is only one, and the stop is kept fixed, said variable focal length lens system being arranged to have a large aperture ratio and high vari-focal ratio, to be extremely compact and to be low in price.

To attain to above-mentioned object, for the variable focal length lens system according to the present invention, such lens composition wherein a part of a zoom lens system comprising four lens units is omitted is adopted as the basic lens composition of the lens system.

A zoom lens system comprising four lens units generally comprises a first lens unit which has a focusing function and has positive refractive power, a second lens unit which has a vari-focal function chiefly and has negative refractive power, a thid lens unit which has a function to chiefly make compensation so as to keep the position of the image surface constant, and a fourth lens unit which is alway kept fixed and which serves as a relay lens for forming an image. The above-mentioned type of zoom lens system makes is possible to obtain a high zoom ratio when arranged to be used with a video camera. For a zoom lens system having the above-mentioned lens composition, it is known that, when the third lens unit having the function to keep the position of the image surface constant is omitted, the image surface comes to the same position in cases of two different focal lengths only. When the above-mentioned point is utilized, it is possible to materialize the variable focal length lens system which is arranged that the focal length is to be changed over between two different focal lengths. When arranged as above, only a focal length varying lens unit is to be moved when varying the focal length and, consequently, the focal length varying mechanism is simplified extremely. Moreover, as the space required for moving the lens unit becmes small, the variation of aberrations also becomes small. Furthermore, it is sufficient as far as aberrations are corrected favourably at two different focal lengths only and, therefore, it will become possible to simplify the lens configuration of the focal length varying lens unit.

The variable focal length lens system according to the present invention is arranged to comprise, in the order from the object side, a first lens unit having positive refractive power as a whole and arranged to be kept fixed when varying the focal length and to have a focusing function, a second lens unit having negative refractive power and arranged to be movable for varying the focal length, and a third lens unit having positive refractive power as a whole and arranged to be kept fixed, said variable focal length lens system being arranged that the first lens unit comprises two lenses, i.e., a negative meniscus lens which is convex toward the object side, and a positive lens, the second lens unit comprises one negative lens, and the third lens unit comprises three or four lenses including at least one negative lens. Besides, said variable focal length lens system is arranged to have simple construction that, when varying the focal length, only the second lens unit is to be moved forward and backward so as to change over the focal length between two different focal lengths and that a stop is provided in the third lens unit and is kept fixed. Furthermore, said variable focal length lens system is arranged to cleverly utilize the strong points of known zoom lens systems comprising four lens units, i.e., the characteristics that the variation of aberrations to be caused by zooming is small and, therefore, it is possible to make the vari-focal ratio high and aperture ratio large.

The variable focal length lens system according to the present invention is arranged as described so far and, at the same time, arranged to fulfill the conditions (1), (2) and (3) shown below:

$$-2 < (r_{IIB} + r_{IIF})/(r_{IIB} - r_{IIF}) < 0.5 \tag{1}$$

$$-4 < f_{II}/f_W < -1.7 \tag{2}$$

$$\nu_{II} > 40 \tag{3}$$

where, reference symbol $r_{IIF}$ represents the radius of curvature of the surface on the object side of the second lens unit, reference symbol $r_{IIB}$ represents the radius of curvature of the surface on the image side of the second lens unit, reference symbol $f_{II}$ represents the focal length of the second lens unit, reference symbol $f_W$ represents the focal length of the lens system as a whole in the wide position, and reference symbol $\nu_{II}$ represents Abbe's number of the negative lens constituting the second lens unit.

By selecting the shape factor of the second lens unit so as to fulfill the conditon (2) and deciding the refractive power of the second lens unit as defined by the condition (2), it is possible to make the variation of spherical aberration to be caused when varying the focal length small even in the case that the second lens unit is arranged to have an extremely simple lens configuration, i.e., to comprise a negative single lens, and to attain a high vari-focal ratio even in case that the aperture ratio is made large (about F/1.8).

If the value defined by the condition (1) becomes larger than the upper limit thereof or smaller than the lower limit thereof and/or if the value defined by the condition (2) becomes larger than the upper limit thereof or smaller than the lower limit thereof, the variation of spherical aberration to be caused when varying the focal length becomes large.

The condition (3) defines Abbe's number of the negative lens constituting the second lens unit and is established in order to make the variation of chromatic aberration small. If the condition (3) is not fulfilled, the variation of chromatic aberration to be caused when varying the focal length becomes large.

Furthermore, it is preferable to arrange that Abbe's numbers $\nu_{In}$ and $\nu_{Ip}$ of the negative meniscus lens and positive lens constituting the first lens unit, refractive index $n_{IIIn}$ of at least one negative lens constituting the third lens unit, and refractive index $n_{IIIp}$ of at least one positive lens constituting the third lens unit respectively fulfill the conditions (4) through (7) shown below.

$$\nu_{In} < 35 \tag{4}$$

$$\nu_{Ip} > 50 \tag{5}$$

$$n_{IIIn} > 1.6 \tag{6}$$

$$n_{IIIp} > 1.65 \tag{7}$$

By selecting Abbe's numbers of the negative meniscus lens and positive lens constituting the first lens unit so as to fulfill the conditions (4) and (5) respectively, it becomes possible to correct chromatic aberration easily. When the condition (4) and/or the condition (5) is not fulfilled, the variation of chromatic aberration becomes large when varying the focal length and when focusing on an object at a short distance.

In case that the third lens unit is arranged to comprise five to seven lenses, it is possible to make the aperture ratio large (to about F/1.8). When, however, an aspherical surface is adopted for one of surfaces at an adequate position, it is possible to correct spherical aberration favourably even when the third lens unit comprises three or four lenses. In that case, to keep the flatness of the offaxial best image surface in relation to the paraxial best image surface in the favourable state at the same time as correcting spherical aberration favourably, it is preferable to arrange that the third lens unit comprises at last one negative lens and at least one positive lens which respectively fulfill the conditions (6) and (7). When the condition (6) and/or the condition (7) is not fulfilled, Petzval's sum becomes a large positive value, and the flatness of the offaxial best image surface in relation to the paraxial best image surface becomes unfavourable.

In case that the third lens unit is to be arranged to comprise three lenses, it is the most preferable to arrange that the third lens unit comprises a first positive lens, a negative lens, and a second positive lens and that the surface on the image side of the first positive lens or the surface on the object side of the first negative lens is formed as an aspherical surface. When the surface on the image side of the first positive lens is to be formed as an aspherical surface, it is preferable to fulfill the conditions (8) and (9) shown below:

$$|\Delta x| \leq 1.5 \times 10^{-3} \cdot f_{III} \text{ (where, } y = 0.5 y_1) \tag{8}$$

$$1.5 \times 10^{-3} \cdot f_{III} \leq \Delta x \leq 5 \times 10^{-2} \cdot f_{III} \text{ (where, } y = y_1) \tag{9}$$

where, reference symbol $\Delta x$ represents the amount of deviation of the aspherical surface from the reference spherical surface in the direction of the optical axis, reference symbol $f_{III}$ represents the total focal length of the third lens unit, reference symbol $y_1$ represents the height of paraxial marginal ray in the wide position, and reference symbol $y$ represents the height from the optical axis.

When the surface on the object side of the first negative lens is to be formed as ans aspherical surface, it is preferable to fulfill the conditions (10) and (11) shown below:

$$|\Delta x| \leq 1.5 \times 10^{-3} \cdot f_{III} \text{ (where, } y = 0.5 y_1) \tag{10}$$

$$-5 \times 10^{-2} \cdot f_{III} \leq \Delta x \leq -1.5 \times 10^{-3} \cdot f_{III} \text{ (where, } y = y_1) \tag{11}$$

When, in the conditions (8) through (11) shown in the above, the condition (8) or the condition (11) is not fulfilled, astigmatism increases and this is not desirable. When $\Delta x$ becomes smaller than the lower limit of the condition (9) or (11), spherical aberration will be undercorrected. When $\Delta x$ becomes larger than the upper limit of the condition (9) or (11), the amount of deviation of the sapherical surface becomes too large, and spherical aberration will be overcorrected.

In the variable focal length lens system according to the present invention, importance is attached to change over of the focal length between two different focal lengths from the view point of the displacement of the image surface to be caused when varying the focal length. When it is desired to photograph also in a position of an intermediate focal length between said two different focal lengths, it is necessary to compensate the displacement of the image surface to be caused at that time. In that case, in the position of the intermediate focal length, the position of the image surface is displaced backward compared with the position of the image surface in the wide position and teleposition (positions of said two different focal lengths). Therefore, when the amount of said displacement of the image surface is represented by reference symbol l, it is possible to compensate said displacement when a glass plate, whose refractive index N and thickness D fulfill the formula (12) shown below, is inserted into the space between the lens system and image surface at the time of photographing in the wide position and teleposition.

$$D = l/(1 - 1/N) \tag{12}$$

That is, when the glass plate fulfilling the formula (12) is inserted, it is possible to photograph in the wide position and teleposition. When said glass plate is removed, it is possible to photograph in the position of the intermediate focal length.

When the above-mentioned compensating method is adopted, it is possible to compensate the displacement of the image surface without additionally providing a slide cam for compensation of the displacement of the image surface. To keep the position of the image surface constant, it is of course possible to adopt a method to insert a positive lens or a negative lens into the space between the second lens unit and third lens unit and to move said lens in the direction of the optical axis so as to keep the position of the image surface constant. When the latter method is adopted, it is possible to use the lens system according to the present invention as a zoom lens system whose vari-focal ratio is 2.5 to 3, numerical aperture is F/1.8, number of lenses constituting the lens system is extremely small, and the price is low.

BRIEF DESCRIPTION OF THE DRAWINGS

FIGS. 9 and 10 respectively show graphs illustrating aberration curves of Embodiment 3 of the present invention.

DETAILED DESCRIPTION OF THE PREFERRED EMBODIMENTS

Figure 1A:
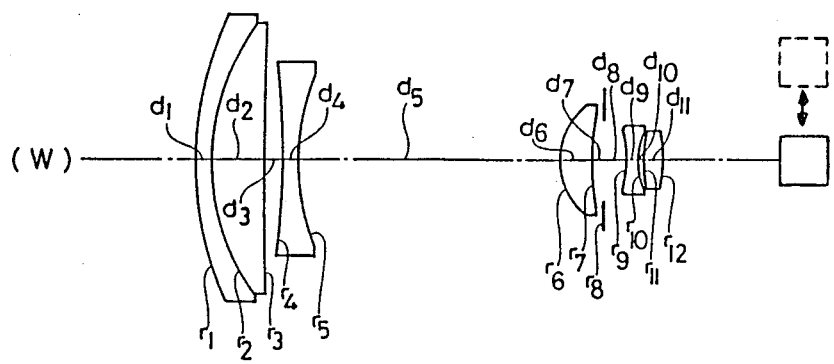
FIGS. 1a through 4b respectively show sectional views of Embodiments 1 through 4 of the variable focal length lens system according to the present invention.

Now, preferred embodiments of the variable focal length lens system according to the present invention described so far are shown below.

Embodiment 1

$f = 10 \sim 25$, F/1.8, $2\omega = 46° \sim 17°$
$r_1 = 30.2711$
$d_1 = 1.4000$    $n_1 = 1.80518$    $\nu_1 = 25.43$
$r_2 = 19.4182$
$d_2 = 4.6000$    $n_2 = 1.60311$    $\nu_2 = 60.70$
$r_3 = 381.9549$
$d_3 = D_1$
$r_4 = -66.6923$
$d_4 = 1.4000$    $n_3 = 1.65160$    $\nu_3 = 58.52$
$r_5 = 19.8213$
$d_5 = D_2$
$r_6 = 5.9984$
$d_6 = 2.9000$    $n_4 = 1.77250$    $\nu_4 = 49.66$
$r_7 = 25.3722$
$d_7 = 1.0000$
$r_8 = \infty$ (stop)
$d_8 = 1.9702$
$r_9 = -10.7502$ (aspherical surface)
$d_9 = 1.0000$    $n_5 = 1.80518$    $\nu_5 = 25.43$
$r_{10} = 7.1338$
$d_{10} = 0.3131$
$r_{11} = 8.0711$
$d_{11} = 1.8000$    $n_6 = 1.77250$    $\nu_6 = 49.66$
$r_{12} = -11.7568$

|    | wide | tele |
|----|------|------|
| $D_1$ | 1.700 | 23.810 |
| $D_2$ | 22.507 | 0.400 |

$\dfrac{r_{IIB} + r_{IIF}}{r_{IIB} - r_{IIF}} = -0.54$, $\dfrac{f_{II}}{f_W} = -2.3$ $|\Delta x| = 3.1 \times 10^{-4} f_{III}$ ($y = 0.5 y_1$)
$\Delta x = -4.3 \times 10^{-3} f_{III}$ ($y = y_1$)
length of lens system as a whole = 4.8 $f_W$
aspherical coeffients (ninth surface)
$E = -0.17215 \times 10^{-2}$
$F = -0.16060 \times 10^{-4}$
$G = 0.38639 \times 10^{-6}$ Embodiment 2

$f = 10 \sim 25$, F/1.8, $2\omega = 46° \sim 17°$
$r_1 = 26.2661$
$d_1 = 1.5000$    $n_1 = 1.80518$    $\nu_1 = 25.43$
$r_2 = 19.9259$
$d_2 = 0.2400$
$r_3 = 20.6741$ -continued

Embodiment 2

| | | |
|---|---|---|
| $d_3 = 5.2000$ | $n_2 = 1.49216$ | $\nu_2 = 57.50$ |
| $r_4 = 376.1796$ | | |
| $d_4 = D_1$ | | |
| $r_5 = -50.5185$ | | |
| $d_5 = 1.4000$ | $n_3 = 1.49216$ | $\nu_3 = 57.50$ |
| $r_6 = 17.3739$ | | |
| $d_6 = D_2$ | | |
| $r_7 = 7.3148$ | | |
| $d_7 = 3.0000$ | $n_4 = 1.77250$ | $\nu_4 = 49.66$ |
| $r_8 = -45.2515$ | | |
| $d_8 = 0.8000$ | | |
| $r_9 = \infty$ (stop) | | |
| $d_9 = 1.1000$ | | |
| $r_{10} = -13.5104$ (aspherical surface) | | |
| $d_{10} = 1.0000$ | $n_5 = 1.80518$ | $\nu_5 = 25.43$ |
| $r_{11} = 12.6077$ | | |
| $d_{11} = 0.8800$ | | |
| $r_{12} = -7.4657$ | | |
| $d_{12} = 1.6000$ | $n_6 = 1.77250$ | $\nu_6 = 49.66$ |
| $r_{13} = -4.6254$ | | |

| | wide | tele |
|---|---|---|
| $D_1$ | 1.600 | 26.355 |
| $D_2$ | 25.147 | 0.400 |

$\frac{r_{IIB} + r_{IIF}}{r_{IIB} - r_{IIF}} = -0.49,\ \frac{f_{II}}{f_W} = -2.6$ $|\Delta x| = 6.0 \times 10^{-4} f_{III} (y = 0.5\ y_1)$
$\Delta x = -9.4 \times 10^{-3} f_{III} (y = y_1)$
length of lens system as a whole = 5.2 $f_W$
aspherical coefficients (tenth surface)
$E = -0.17969 \times 10^{-2}$
$f = -0.68465 \times 10^{-4}$
$G = 0.23162 \times 10^{-5}$

Embodiment 3

$f = 10 \sim 25$, F/1.8, $2\omega = 47° \sim 17°$

| | | |
|---|---|---|
| $r_1 = 22.6575$ | | |
| $d_1 = 1.4000$ | $n_1 = 1.80518$ | $\nu_1 = 25.43$ |
| $r_2 = 14.8305$ | | |
| $d_2 = 4.7000$ | $n_2 = 1.60311$ | $\nu_2 = 60.70$ |
| $r_3 = 99.5521$ | | |
| $d_3 = D_1$ | | |
| $r_4 = -41.0757$ | | |
| $d_4 = 1.4000$ | $n_3 = 1.60311$ | $\nu_3 = 60.70$ |
| $r_5 = 17.2949$ | | |
| $d_5 = D_2$ | | |
| $r_6 = 7.7609$ | | |
| $d_6 = 2.8000$ | $n_4 = 1.77250$ | $\nu_4 = 49.66$ |
| $r_7 = -33.7841$ (aspherical surface) | | |
| $d_7 = 1.0000$ | | |
| $r_8 = \infty$ (stop) | | |
| $d_8 = 1.6444$ | | |
| $r_9 = -18.7585$ | | |
| $d_9 = 1.0000$ | $n_5 = 1.80518$ | $\nu_5 = 25.43$ |
| $r_{10} = 7.4105$ | | |
| $d_{10} = 0.3400$ | | |
| $r_{11} = 36.4353$ | | |
| $d_{11} = 1.7000$ | $n_6 = 1.77250$ | $\nu_6 = 49.66$ |
| $r_{12} = -8.8037$ | | |

| | wide | tele |
|---|---|---|
| $D_1$ | 1.700 | 20.663 |
| $D_2$ | 19.370 | 0.400 |

$\frac{r_{IIB} + r_{IIF}}{r_{IIB} - r_{IIF}} = -0.41,\ \frac{f_{II}}{f_W} = -2.0$ $|\Delta x| = 3.5 \times 10^{-4} f_{III} (y = 0.5\ y_1)$
$\Delta x = 6.3 \times 10^{-3} f_{III} (y = y_1)$
length of lens system as a whole = 4.5 $f_W$
aspherical coefficients (seventh surface)
$E = 0.37927 \times 10^{-3}$
$F = -0.17027 \times 10^{-5}$
$G = 0.94522 \times 10^{-7}$

Embodiment 4

$f = 10 \sim 30$, F/1.8, $2\omega = 45° \sim 15°$

| | | |
|---|---|---|
| $r_1 = 21.1670$ | | |
| $d_1 = 1.5000$ | $n_1 = 1.84666$ | $\nu_1 = 23.78$ |
| $r_2 = 16.2412$ | | |
| $d_2 = 0.2800$ | | |
| $r_3 = 16.9111$ | | |
| $d_3 = 4.3000$ | $n_2 = 1.62041$ | $\nu_2 = 60.27$ |
| $r_4 = 52.8897$ | | |
| $d_4 = D_1$ | | |
| $r_5 = 1632.0990$ | | |
| $d_5 = 1.4000$ | $n_3 = 1.62041$ | $\nu_3 = 60.27$ |
| $r_6 = 13.4075$ | | |
| $d_6 = D_2$ | | |
| $r_7 = 7.3872$ | | |
| $d_7 = 3.0000$ | $n_4 = 1.77250$ | $\nu_4 = 49.66$ |
| $r_8 = -102.5191$ | | |
| $d_8 = 1.0000$ | | |
| $r_9 = \infty$ (stop) | | |
| $d_9 = 1.8511$ | | |
| $r_{10} = -8.2290$ (aspherical surface) | | |
| $d_{10} = 1.0000$ | $n_5 = 1.84666$ | $\nu_5 = 23.78$ |
| $r_{11} = 19.1492$ | | |
| $d_{11} = 0.7000$ | | |
| $r_{12} = -22.7118$ | | |
| $d_{12} = 1.8000$ | $n_6 = 1.77250$ | $\nu_6 = 49.66$ |
| $r_{13} = -5.7818$ | | |

| | wide | tele |
|---|---|---|
| $D_1$ | 1.700 | 26.873 |
| $D_2$ | 25.566 | 0.400 |

$\frac{r_{IIB} + r_{IIF}}{r_{IIB} - r_{IIF}} = -1.02,\ \frac{f_{II}}{f_W} = -2.2$ $|\Delta x| = 3.0 \times 10^{-4} f_{III} (y = 0.5\ y_1)$
$\Delta x = -5.0 \times 10^{-} f_{III} (y = y_1)$
length of lens system as a whole = 5.3 $f_W$
aspherical coefficients (tenth surface)
$E = -0.13282 \times 10^{-2}$
$F = -0.20372 \times 10^{-5}$
$G = -0.99698 \times 10^{-6}$ In respective embodiments shown in the above, reference symbols $r_1, r_2, \ldots$ respectively represent radii of curvature of respective lens surfaces, reference symbols $d_1, d_2, \ldots$ respectively represent thicknesses of representative lenses and airspaces between respective lenses, reference symbols $n_1, n_2, \ldots$ respectively represent refractive indices of respective lenses, and reference symbols $\nu_1, \nu_2, \ldots$ respectively represent Abbe's numbers of respective lenses.

Figure 1B:
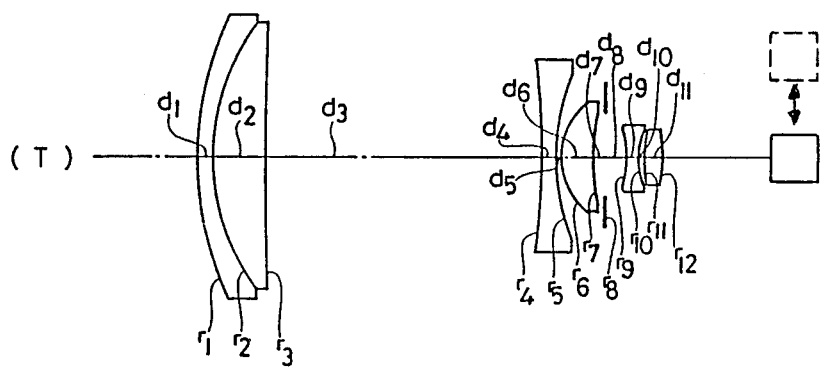
Figure 5:
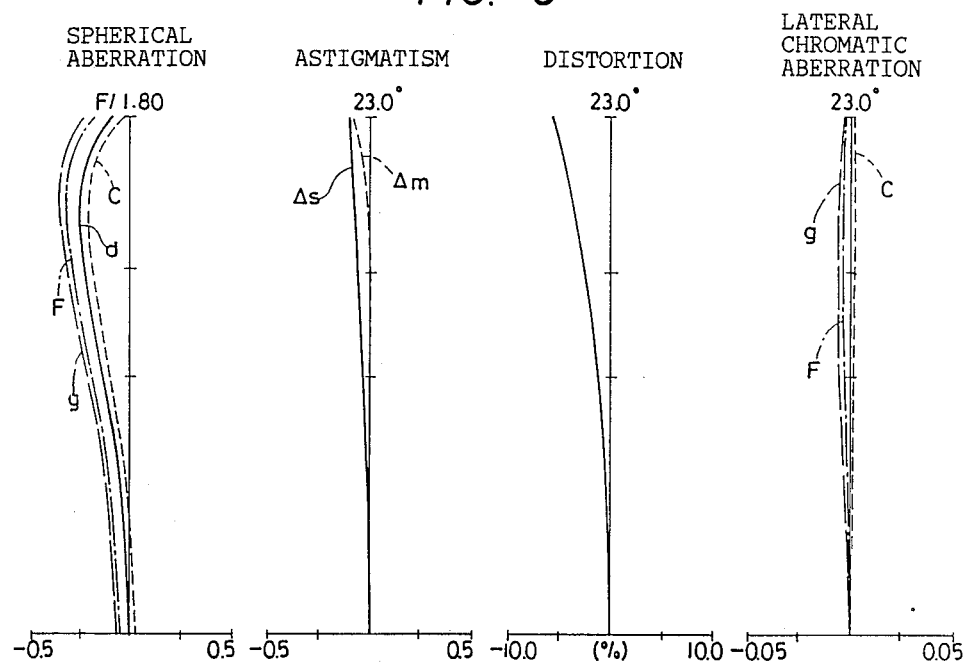
FIGS. 5 and 6 respectively show graphs illustrating aberration curves of Embodiment 1 of the present invention.
Figure 6:
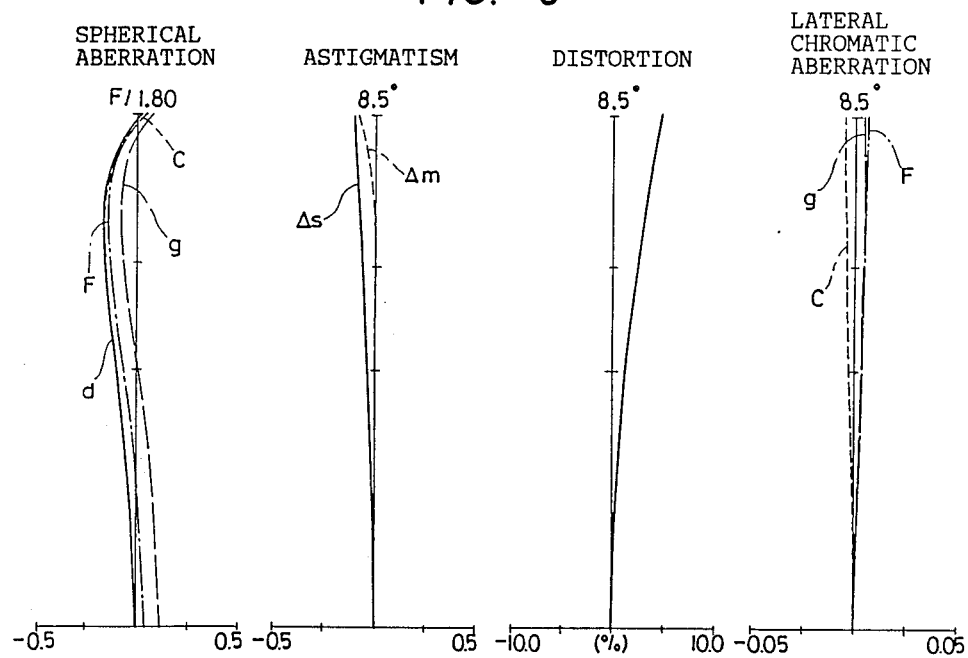

Out of respective embodiments shown in the above, Embodiment 1 has the lens configuration as shown in FIG. 1. That is, the first lens unit comprises a cemented doublet which consists of a negative meniscus lens and a positive lens, the second lens unit comprises a negative lens, and the third lens unit comprises a positive lens, a negative lens, and a positive lens. In Embodiment 1, the ninth surface ($r_9$) is arranged as an aspherical surface. Aberration curves of Embodiment 1 in the wide position and teleposition are as shown in FIGS. 5 and 6 respectively.

Figure 2A:
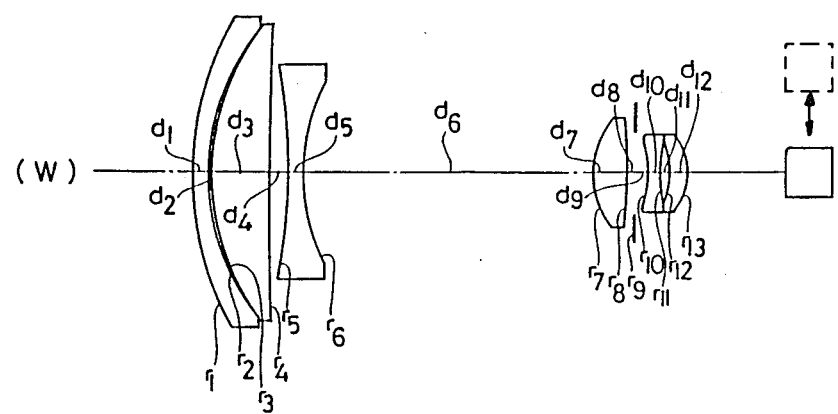
Figure 2B:
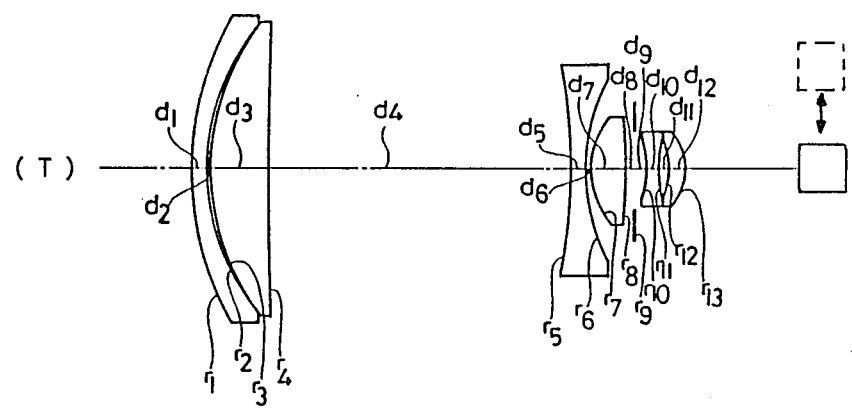
Figure 7:
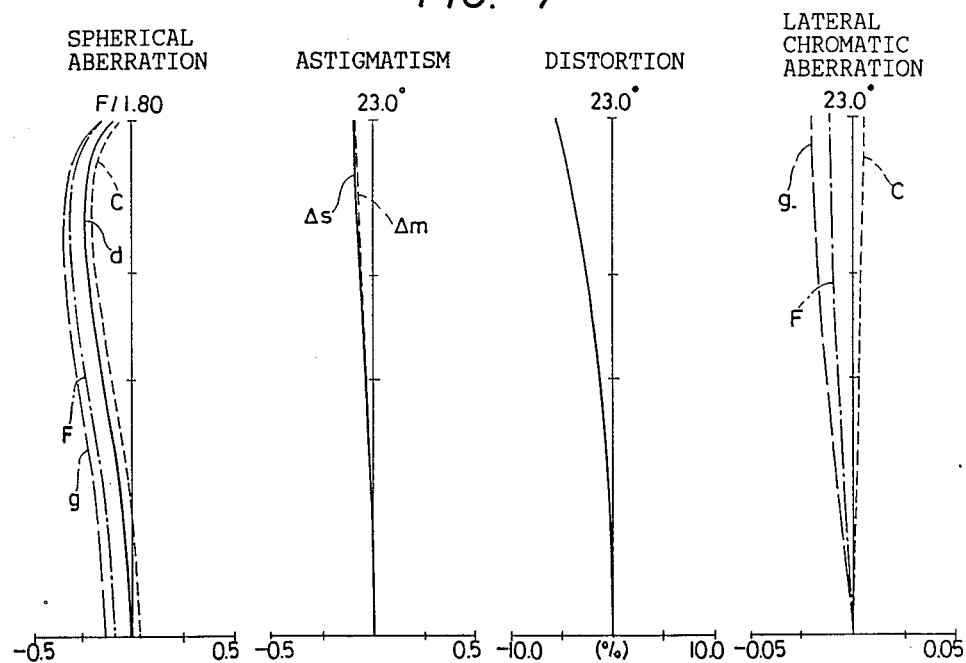
FIGS. 7 and 8 respectively show graphs illustrating aberration curves of Embodiment 2 of the present invention.
Figure 8:
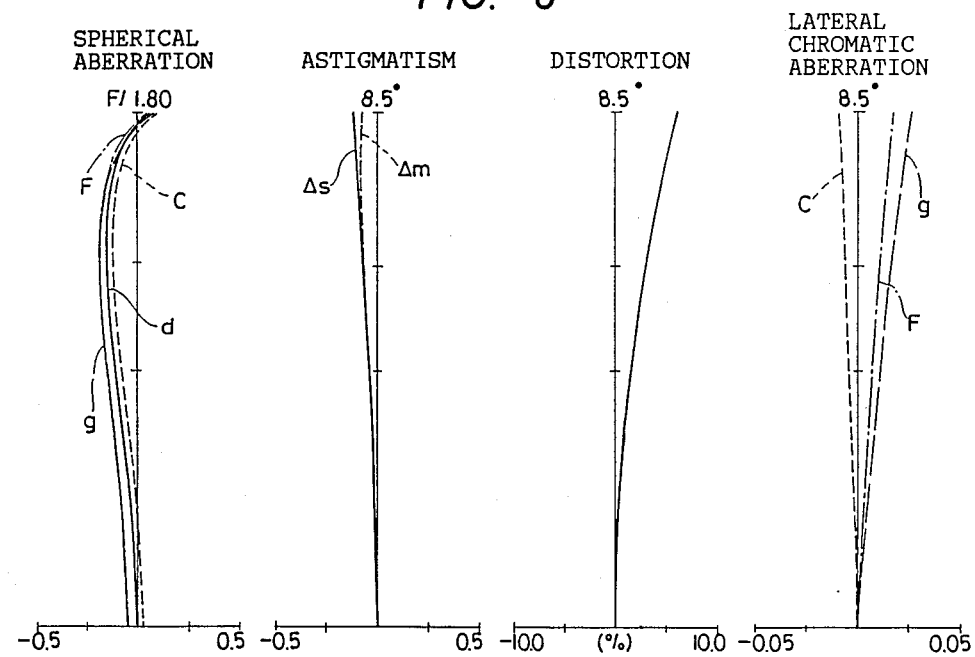

Embodiment 2 has the lens configuration as shown in FIG. 2. That is, the first lens unit comprises a negative meniscus lens and a positive lens which are separated from each other. The other lens units have lens configurations similar to those of Embodiment 1. In Embodiment 2, the tenth surface ($r_{10}$) is arranged as an aspherical surface. Aberration curves of Embodiment 2 in the wide position and teleposition are as shown in FIGS. 7 and 8 respectively.

Figure 3A:
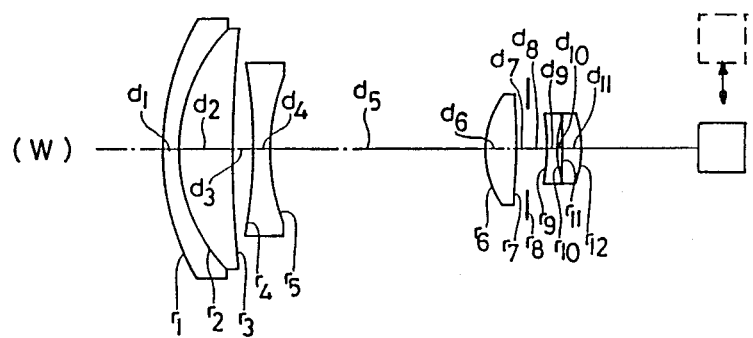
Figure 3B:
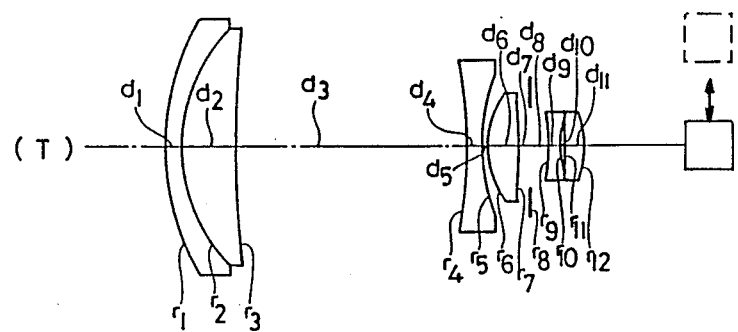

Embodiment 3 has the lens configuration as shown in FIG. 3. That is, the first lens unit comprises a cemented doublet in the same way as Embodiment 1. In Embodiment 3, the seventh surface ($r_7$) is arranged as an aspherical surface. Aberration curves of Embodiment 3 in the wide position and teleposition are as shown in FIGS. 9 and 10 respectively.

Figure 4A:
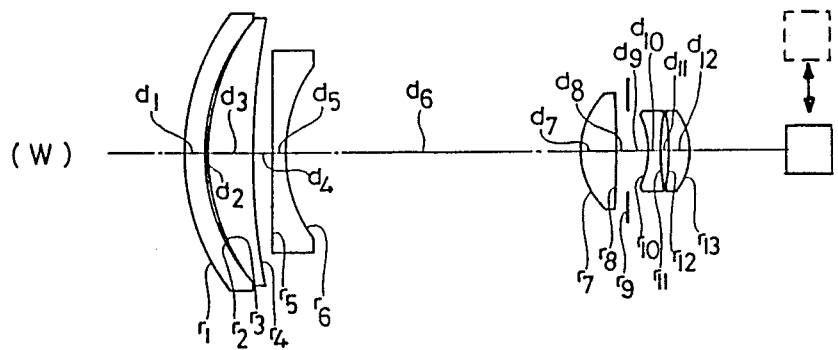
Figure 4B:
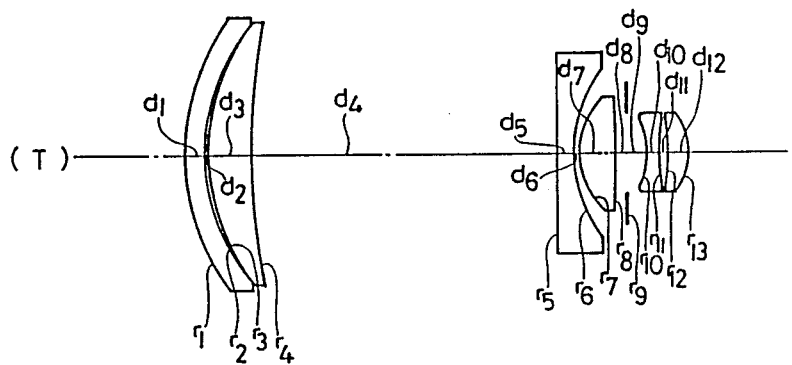
Figure 11:
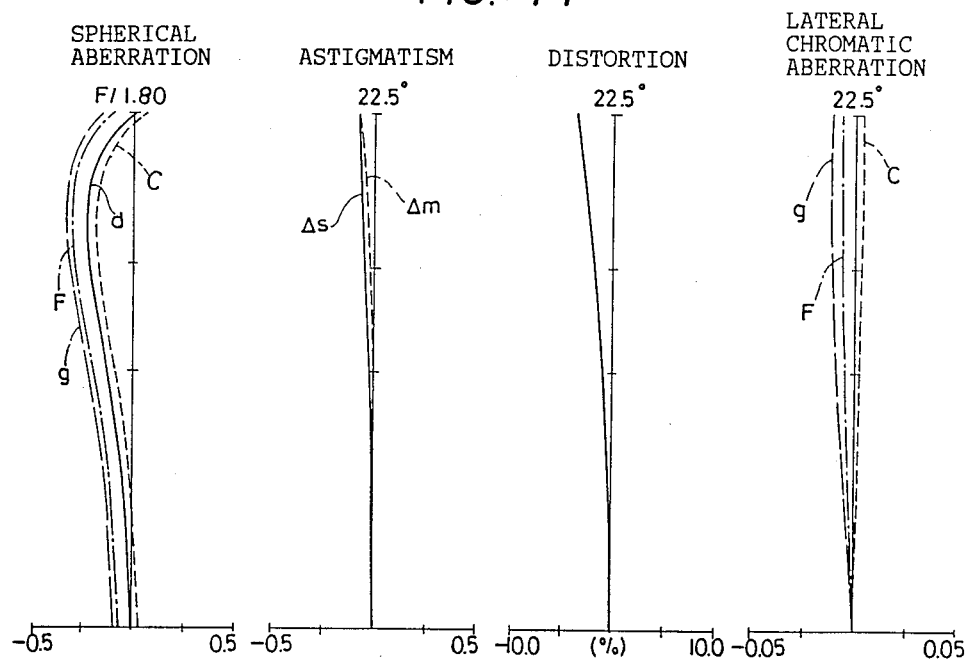
FIGS. 11 and 12 respectively show graphs illustrating aberration curves of Embodiment 4 of the present invention.
Figure 12:
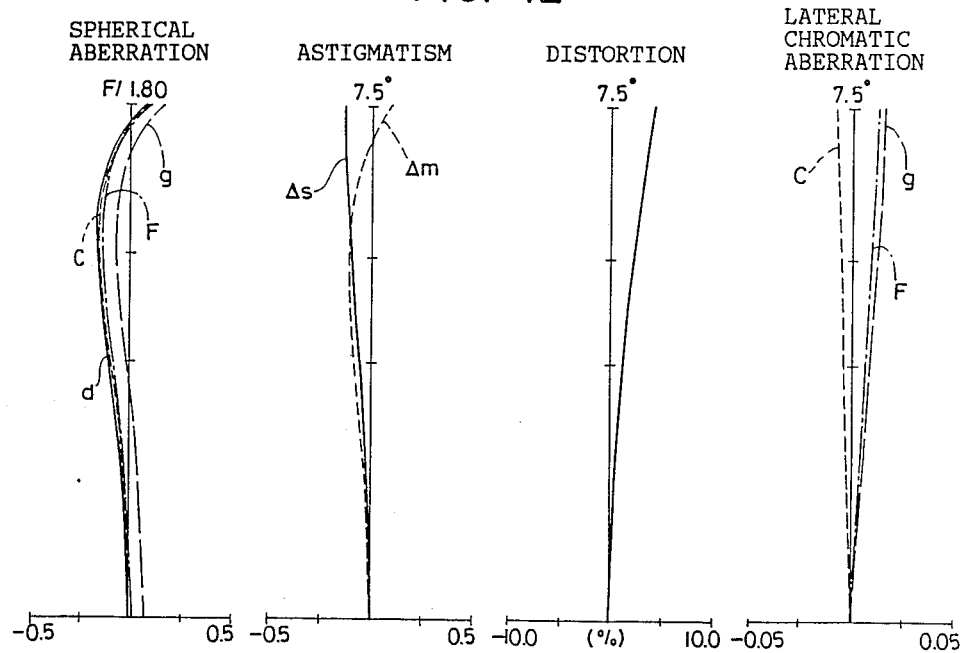

Embodiment 4 has the lens configuration as shown in FIG. 4. That is, the first lens unit comprise a negative meniscus lens and a positive lens which are separated from each other in the same way as Embodiment 2. In Embodiment 4, the tenth surface ($r_{10}$) is arranged as an aspherical surface. Aberration curves of Embodiment 4 in the wide position and teleposition are as shown in FIGS. 11 and 12 respectively.

The shape of the aspherical surface adopted in each embodiment is expressed by the formula shown below when the x axis is traced in the direction of the optical axis and the y axis is traced in the direction perpendicular to the optical axis taking the intersecting point betweem the aspherical surface and optical axis as the origin:

$$y = \frac{x^2/r}{1 + \sqrt{1 - (x/r)^2}} + Ex^4 + Fx^6 + Gx^8 + \ldots$$

where, reference symbol r represents the radius of curvature of the vertex portion of the aspherical surface, and reference symbols E, F, G, ... respectively represent the coefficients of aspherical surface.

As described so far, the present invention provides a variable focal lenght lens system which is arranged as a lens system with simple construction wherein the number of lenses constituting the lens system is six to seven only one lens unit is arranged as a movable lens unit and the stop is fixed and, at the same time, which is arranged that the vari-focal ratio is 2.5 to 3, the F-number is 1.8, and the ratio of the overall length of the lens system to the focal length in the wise position is about 5, said variable focal length lens system being thereby arranged to have a large aperture ratio and a high vari-focal ratio and to be small in size, light in weight and low in price, said variable focal length lens system being arranged to be used with a video camera and to be used by changing over the focal length.

We claim:

1. A variable focal length lens system comprising, in the order from the object side:
    a first lens unit consisting of a negative meniscus lens convex toward the object side and a positive lens, having positive refractive power as a whole, arranged to be kept fixed when varying the focal length of the whole lens system and arranged to be movable along the optical axis for the purpose of focusing;
    a second lens unit consisting of a negative single-element lens and arranged to be movable only for the purpose of varying the focal length of the whole lens system; and
    a third lens unit having a lens composition wherein two positive lenses are arranged on both the sides of at least one negative lens with airspaces reserved, comprising at last three lenses, having positive refractive power as a whole and arranged to be kept fixed when varying the focal length of the whole lens system;
    said lens system being designed in such a maner that an image of an object located at a position is formed at substantially the same position when said second unit is displaced on the extreme object side and on the extreme image side;
    further comprising air spaces between each of said first lens unit and said second lens unit and between said second lens unit and said third lens unit; and said system fulfilling the conditions (1), (2) and (3) shown below:

$$-2 < (r_{IIB} + r_{IIF})/(r_{IIB} - r_{IIF}) < 0.5 \tag{1}$$

$$-4 < f_{II}/f_W < -1.7 \tag{2}$$

$$\nu_{II} > 40 \tag{3}$$

where, reference symbol $r_{IIF}$ represents the radius of curvature of the surface on the object side of the second lens unit, reference symbol $r_{IIB}$ represents the radius of curvature of the surface on the image side of the second lens unit, reference symbol $f_{II}$ represents the focal length of the second lens unit, reference symbol $f_W$ represents the focal length of the lens system as a whole in the wide position, and reference symbol $\nu_{II}$ represents Abbe's number of the second lens unit.

2. A variable focal length lens system according to claim 1 wherein a transparent plane parallel plate for compensation for the displacement of the position of the image surface is interposed at the wide position and tele position respectively, and said transparent plane parallel plate fulfills the condition (12) shown below:

$$l = \left(1 - \frac{1}{N}\right)D \tag{12}$$

where, reference symbol l represents the amount of displacement of the position of the image surface, reference symbol N represents the refractive index of the glass plate, and reference symbol D represents the new thickness of the glass plate.

3. A variable focal length lens system comprising, in the order from the object side:
    a first lens unit consisting of a negative meniscus lens convex toward the object side and a positive lens, having positive refreactive power as a whole, arranged to be kept fixed when varying the focal length of the whole lens system and arranged to be movable along the optical axis for the purpose of focusing;
    a second lens unit consisting of a negative single-element lens and arranged to be movable only for the purpose of varying the focal length of the whole lens system; and
    a third lens unit having a lens composition wherein two positive lenses are arranged on both the sides of at least one negative lens with airspaces reserved, comprising at least three lenses, having positive refractive power as a whole and arranged to be kept fixed when varying the focal length of the whole lens system;
    said lens system being designed in such a manner that an image of an object located at a position is formed at substantially the same position when said second unit is displaced on the extreme object side and on the extreme image side;
    comprising an air space between one of said first lens unit and said second lens unit and between said second lens unit and said third lens unit; and said system fulfilling the conditions (1), (2) and (3) shown below:

$$-2 < (r_{IIB} + r_{IIF})/(r_{IIB} - r_{IIF}) < -0.4 \quad (1)$$

$$-4 < f_{II}/f_W < -2.0 \quad (2)$$

$$\nu_{II} > 40 \quad (3)$$

where, reference symbol $r_{IIF}$ represents the radius of curvature of the surface on the object side of the second lens unit, reference symbol $r_{IIB}$ represents the radius of curvature of the surface on the image side of the second lens unit, reference symbol $f_{II}$ represents the focal length of the second lens unit, reference symbol $f_W$ represents the focal length of the lens system as a whole in the wide position, and reference symbol $\nu_{II}$ represents Abbe's number of the second lens unit.

4. A variable focal length lens system according to claim 3 wherein a transparent plane parallel plate for compensation for the displacement of the position of the image surface is interposed at the wide position and tele position respectively, and said transparent plane parallel plate fulfills the condition (12) shown below:

$$l = \left(1 - \frac{1}{N}\right)D \quad (12)$$

where, reference symbol l represents the amount of displacement of the position of the image surface, reference symbol N represents the refractive index of the glass plate, and reference symbol D represents the new thickness of the glass plate.

5. A variable focal length lens system according to claim 1 or 3 arranged that Abbe's number $\nu_{In}$ and $\nu_{Ip}$ of said negative meniscus lens and said positive lens constituting said first lens unit respectively fulfill the conditions (4) and (5) shown below, refractive index $n_{IIIn}$ of at least one negative lens included in said third lens unit and refractive index $n_{IIIp}$ of at least one positive lens constituting said third lens unit respectively fulfill the conditions (6) and (7) shown below, and at least one surface in said third lens unit is arranged as an aspherical surface:

$$\nu_{In} < 35 \quad (4)$$

$$\nu_{Ip} > 50 \quad (5)$$

$$n_{IIIn} > 1.6 \quad (6)$$

$$n_{IIIp} > 1.65 \quad (7).$$

6. A variable focal length lens system according to claim 5 wherein a transparent plane parallel plate for compensation for the displacement of the position of the image surface is interposed at the wide position and tele position respectively, and said transparent plane parallel plate fulfills the condition (12) shown below:

$$l = \left(1 - \frac{1}{N}\right)D \quad (12)$$

where, reference symbol l represents the amount of displacement of the position of the image surface, reference symbol N represents the refractive index of the glass plate, and reference sybmol D represents the new thickness of the glass plate.

7. A variable focal length lens system accordint to claim 1 or 3 wherein said third lens unit comprises a first positive lens, a negative lens, and a second positive lens in the order from the object side, and wherein the surface on the image side of said first positive lens is arranged as an aspherical surface fulfilling the conditions (8) and (9) shown below:

$$|\Delta x| \leq 1.5 \times 10^{-3} \cdot f_{III}(y = 0.5y_1) \quad (8)$$

$$1.5 \times 10^{-3} \cdot f_{III} \leq \Delta x \leq 5 \times 10^{-2} \cdot f_{III}(y = y_1) \quad (9)$$

where, reference symbol $\Delta x$ represents the amount of deviation of the aspherical surface from the reference spherical surface in the direction of the optical axis, reference sybmol $f_{III}$ represents the total focal length of the third lens unit, reference symbol $y_1$ represents the height of paraxial marginal ray in the wide position, and reference symbol y represents the height from the optical axis.

8. A variable focal length lens system according to claim 7 wherein a transparent plane parallel plate for compensation for the displacement of the position of the image surface is interposted at the wide position and the tele position respectively, and said transparent plane parallel plate fulfills the condition (12) shown below:

$$l = \left(1 - \frac{1}{N}\right)D \quad (12)$$

where, reference symbol l represents the amount of displacement of the position of the image surface, reference symbol N represents the refractive index of the glass plate, and reference symbol D represents the new thickness of the glass plate.

9. A variable focal length lens system according to claim 7 wherein a transparent plane parallel plate for compensation for the displacement of the position of the image surface is interposed at the wide position and tele position respectively, and said transparent plane parallel plate fulfills the condition (12) shown below:

$$l = \left(1 - \frac{1}{N}\right)D \quad (12)$$

where, reference symbol l represents the amount of displacement of the position of the image surface, reference symbol N represents the refractive index of the glass plate, and reference symbol D represents the new thickness of the glass plate.

10. A variable focal length lens system according to claim 1 or 3 wherein said third lens unit comprises a first positive lens, a negative lens, and a second positive lens in the order from the object side, and wherein the surface on the object side of the negative lens is arranged as an aspherical surface fulfilling the conditions (10) and (11) shown below:

$$|\Delta x| \leq 1.5 \times 10^{-3} \cdot f_{III}(y = 0.5y_1) \quad (10)$$

$$-5 \times 10^{-2} \cdot f_{III} \leq \Delta x \leq -1.5 \times 10^{-3} \cdot f_{III}(y = y_1) \quad (11).$$

11. A variable focal length lens system according to claim 10 wherein a transparent plane parallel plate for compensation for the displacement of the position of the image surface is interposed at the wide position and tele position respectively, and said transparent plane parallel plate fulfills the condition (12) shown below:

$$l = \left(1 - \frac{1}{N}\right)D \tag{12}$$

where, reference symbol l represents the amount of displacement of the position of the image surface, reference symbol N represents the refractive index of the glass plate, and reference symbol D represents the new thickness of the glass plate.

* * * * *